No. 685,262. Patented Oct. 29, 1901.
G. CULLEY.
DEVICE FOR TURNING MUSIC LEAVES.
(Application filed Mar. 30, 1901.)
(No Model.)
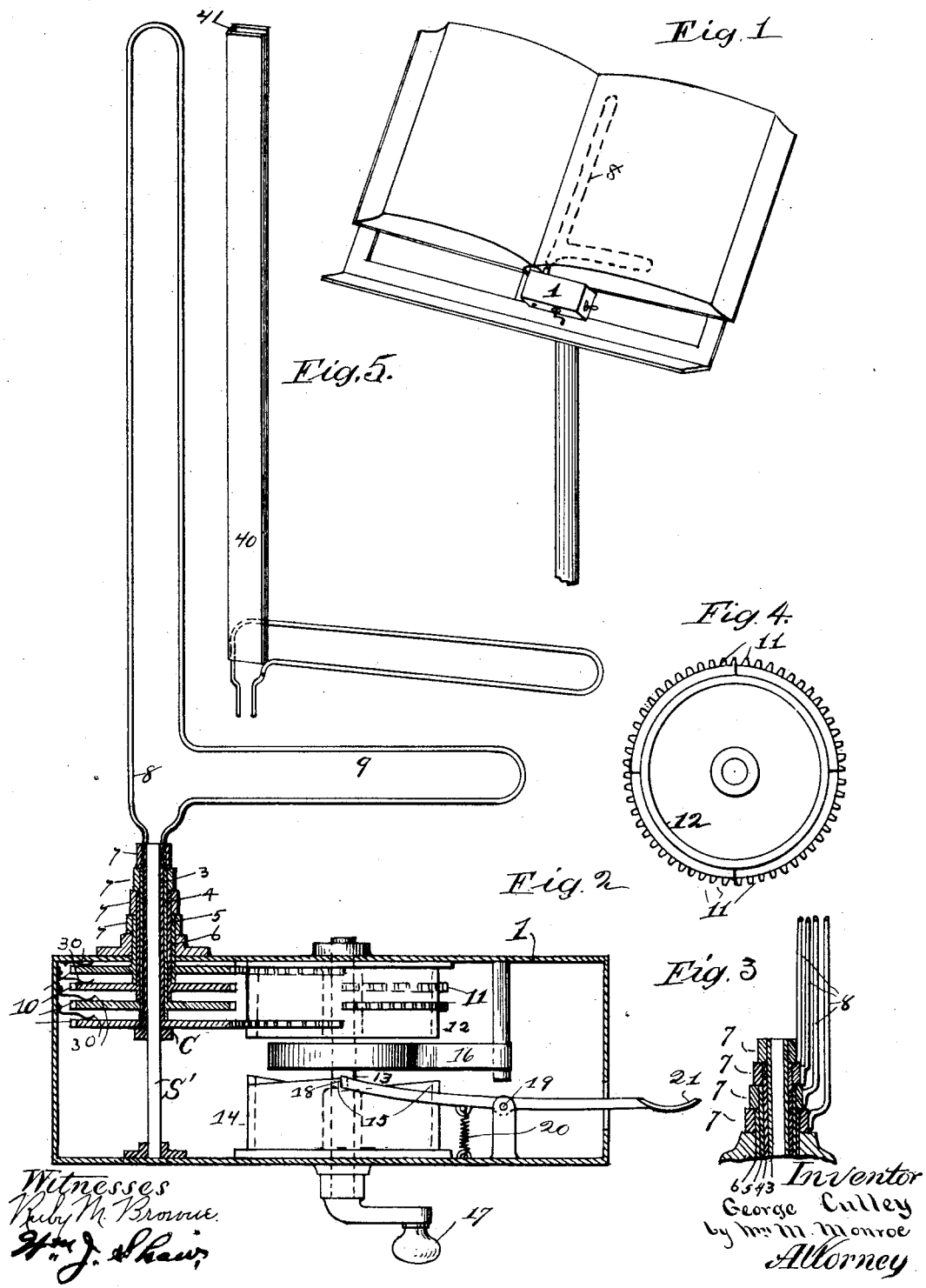

UNITED STATES PATENT OFFICE.

GEORGE CULLEY, OF CLEVELAND, OHIO.

DEVICE FOR TURNING MUSIC-LEAVES.

SPECIFICATION forming part of Letters Patent No. 685,262, dated October 29, 1901.

Application filed March 30, 1901. Serial No. 53,720. (No model.)

*To all whom it may concern:*

Be it known that I, GEORGE CULLEY, a citizen of the United States, and a resident of Cleveland, county of Cuyahoga, State of Ohio, have invented certain new and useful Improvements in Devices for Turning Music-Leaves, of which I hereby declare the following to be a full, clear, and exact description, such as will enable others skilled in the art to which it appertains to make and use the same.

My invention relates to improvements in devices for turning the leaves of a music-book while lying upon the rack of an instrument or music-stand; and the objects of the invention are to provide a device for this purpose which will be readily accessible and by means of which a leaf can be turned without loss of time and with the minimum exertion of force by the performer. I accomplish these objects by means of the spring-operated mechanism hereinafter described, shown in the accompanying drawings, and specifically pointed out in the claims.

In the accompanying drawings, Figure 1 represents the device in position upon a music-stand with the leaf-turning devices inserted between the leaves of a book placed upon the stand. Fig. 2 is a sectional view taken longitudinally of the leaf-turning fingers and centrally through the spindles therefor. Fig. 3 is a detail view in section, showing the manner of attaching the fingers to their respective spindles and is taken on center line of spindles at right angles to Fig. 2. Fig. 4 is a plan view of sectional gearing, and Fig. 5 is a detail of a modified form of finger constructed to retain a loose leaf in the music while it is being turned.

In the views, 1 is an inclosing case provided with any convenient means for attachment to the music-rack. In this case are mounted the spindles 3, 4, 5, and 6, provided with short sleeves 7, to which the fingers 8 are attached upon one side. These fingers are shown as wires bent to a rectangular form and doubled back to give the fingers breadth. The projecting portion 9 engages the lower edge of the leaf, and the longitudinal portion is inserted near the binding. The spindles are sleeved one over the other, thus giving to each the same center of revolution, and the fingers are attached to the short sleeves 7, as shown in Fig. 3, being bent so as to pass one another readily without interfering. The nest of spindles thus formed is sleeved over a standard S', mounted vertically upon the bottom of the case and projecting through the top. The nest of spindles rests upon a collar C upon this standard. To each spindle is secured a spur-gear 10, which is arranged to engage an oppositely-placed segmental gear 11 upon the adjacent drum 12. These segmental gears are so placed as to successively engage their several corresponding spur-gears one after the other, and thus operate each finger in turn through one-half of a revolution, or sufficient to turn one page of the book. It will be seen that the lower gear and inner spindle rest directly upon the collar C, and each gear above or gear-hub rests upon the gear below. The short sleeves 7, secured to the upper extremities of the spindles, fasten them all in place.

The drum 12 is mounted upon the shaft 13, and a second drum 14, provided with as many ratchet-teeth 15 as there are segmental gears, is also placed upon the shaft. A handle 17 is employed to wind up the spring 16 upon the shaft 13. A dog 18 engages the ratchet-teeth and is pivoted at 19 within the case. A spring 20 retains the dog in engagement with the ratchet, and the spring 16 cannot operate to rotate the segment-gears and the spindles until the dog is released by pressing upon the outer extremity of the lever at 21.

It will be seen that a slight pressure upon the lever at 21 will release the spring, and one of the segments will engage with and rotate one of the gears until the dog engages the next tooth of the ratchet. Thus the operation of the device is perfectly under the control of the operator, and the slight movement of the finger required to release the ratchet-dog will not be any great inconvenience to the performer or interrupt his playing.

As many gears and segments may be employed as there are leaves to be turned, some compositions comprising a large number of pages, and springs, as 30, may be made to rest against the gears to provide a frictional resistance, so as to prevent more than one spindle from moving at a time in case two or more should stick together.

In Fig. 5 a thin sheet of metal 40 is doubled at 41, so as to inclose the edge of a loose leaf, which is apt to give great trouble to the performer.

Having described my invention, what I claim as new, and desire to secure by Letters Patent, is—

1. In a music-leaf-turning device, the combination with a suitable case, of a cylindrical standard therein mounted upon the lower side of the case and projecting through the upper side, a collar upon said standard, spindles sleeved over said standard, one spindle being sleeved over the other, a gear upon the lower extremities of each spindle, the lower gear resting upon said collar and each gear-hub or spindle extremity of the remaining gears resting upon the gear next below it, a sleeve secured to the upper extremity of each spindle, a wire turner or finger for each sleeve, said turner being looped at its upper extremity and having each lower extremity secured upon one side of one of the sleeves, the said sleeves increasing gradually in size and the said turners being bent above their points of attachment to the sleeves so as not to interfere with one another in passing, substantially as described.

2. In combination, a case, a vertical standard mounted within said case and projecting through one side thereof, a collar on said standard, hollow spindles sleeved one upon the other and the nest of spindles sleeved upon said standard and resting on said collar, a short sleeve secured to the upper extremity of each spindle, a wire turner secured upon one side of each short sleeve, and each turner bent at its base so as to pass the next adjacent turner, a gear secured to each spindle at its lower end, a drum adjacent to said standard, a drum-shaft parallel to said standard, a coiled spring and a ratchet-wheel upon said shaft, a spring-actuated dog arranged to engage said ratchet-wheel, segmental gears upon said drum arranged to engage in turn said spindle-gears, and a handle upon said shaft, substantially as and for the purpose set forth.

3. In combination, a case, a vertical standard therein, a nest of spindles sleeved upon said standard, a gear upon the lower extremity of each spindle, a sleeve secured to the upper extremity of each spindle, a wire leaf-turner secured to one side of each sleeve and bent to pass the next adjacent turner, a shaft parallel to the standard, a drum, a coiled spring and a ratchet-wheel upon said shaft, segmental gears upon the drum arranged to engage in turn the gears upon the spindles, a spring-actuated dog arranged to engage said ratchet-wheel and provided with an extension beyond the case, and springs 30 secured to the case and arranged to engage the gears upon the spindles, substantially as and for the purpose described.

In testimony whereof I have signed my name to this specification in the presence of two subscribing witnesses.

GEORGE CULLEY.

Witnesses:
  WM. J. SHAW,
  WM. M. MONROE.